INVENTOR
Robert E. Reeve

BY Webster & Webster
ATTORNEYS

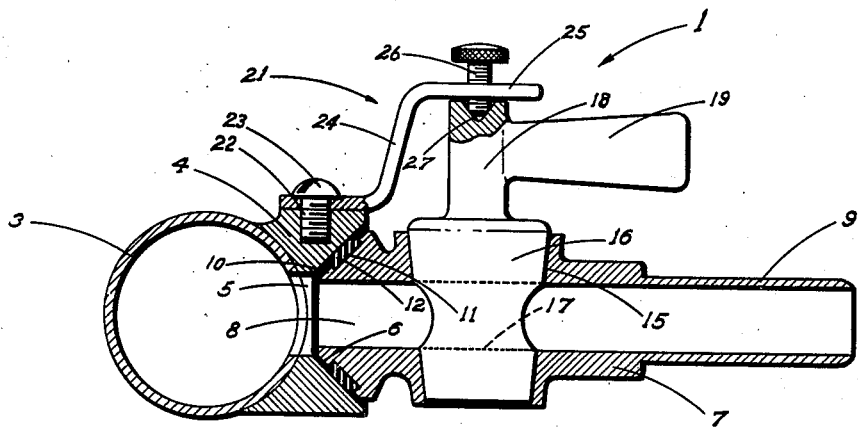
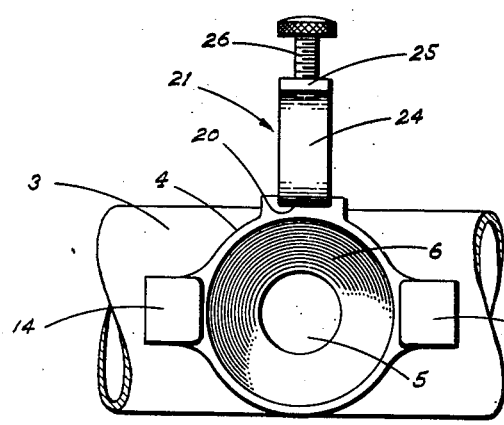
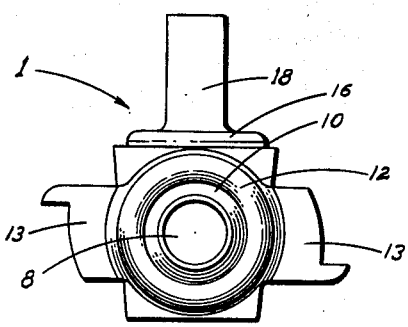

Patented June 2, 1953

2,640,497

UNITED STATES PATENT OFFICE 2,640,497

VALVE FOR MILKING SYSTEMS

Robert E. Reeve, Tracy, Calif.

Application November 6, 1951, Serial No. 254,990

4 Claims. (Cl. 137—738)

This invention relates generally to an improvement in valves; the instant application being a continuation as to all common subject matter of application Serial No. 225,088, filed May 8, 1951, on Valve.

In particular the invention is directed to, and it is an object to provide, a novel valve for use in dairies or the like.

Another important object of the present invention is to provide a valve which is especially designed, but not limited, for use in connection between a milk feed hose and a pipe line in a continuous milking system.

An additional object of the invention is to provide a valve, as above, which comprises a plurality of parts which are separable for the purpose of convenience and effective washing and sterilization of the same; such parts being arranged for ready and quick separation or coupling, manually.

A further object of the invention is to provide a valve for the purpose described which includes a novel quick-coupling and sealing unit between one part fixed to the pipe line of the milking system, and another part which connects to the milk feed hose; the latter part having a plug valve associated therewith to control liquid flow through the device.

It is also an object of the invention to provide a valve which is designed for ease and economy of manufacture.

Still another object of the invention is to provide a practical and reliable valve, and yet one which will be exceedingly effective for the purpose for which it is designed.

These objects are accomplished by means of such structure and relative arrangement of parts, as will fully appear by a perusal of the following specification and claims.

In the drawings:

Fig. 3 is a longitudinal sectional view of Fig. 1.

Fig. 4 is an end view of the fixed body part looking toward the wide angle taper seat.

Fig. 5 is an inner end view of the separable body part looking toward the frusto-conical coupling head.

Figure 1:
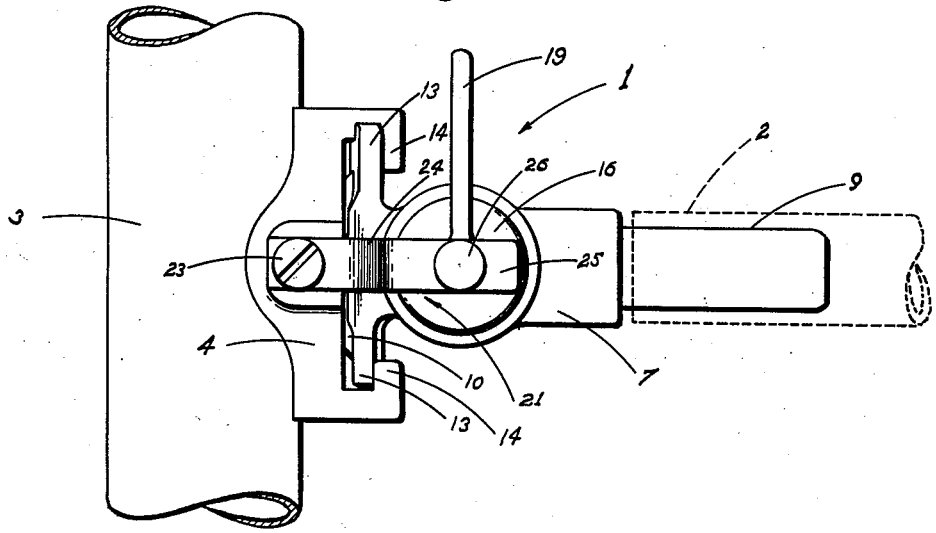
Fig. 1 is a plan view of the valve with all the parts in engagement, as for use.
Figure 2:
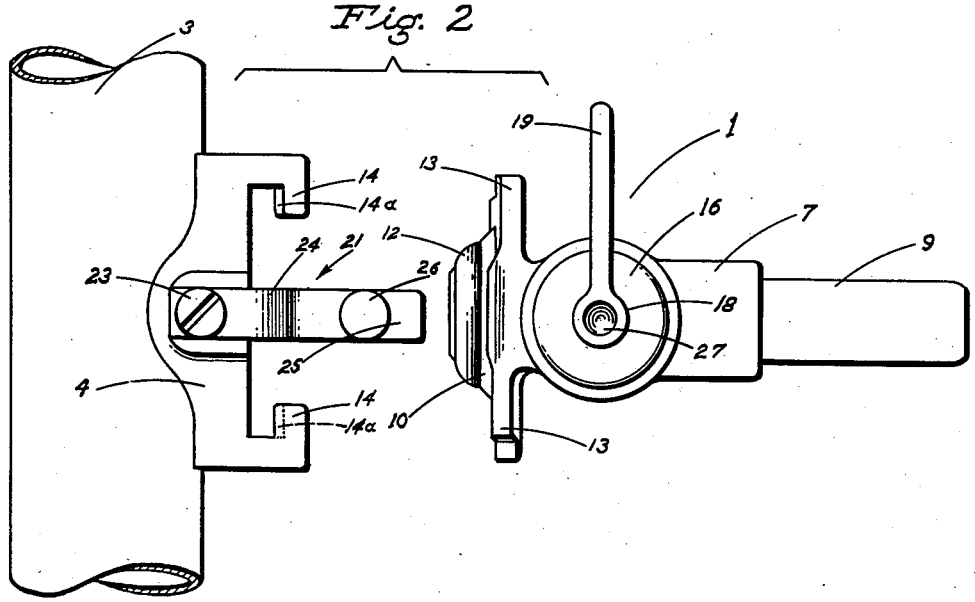
Fig. 2 is a longitudinal sectional elevation of the valve.

Referring now more particularly to the characters of reference on the drawings, the valve, which is indicated generally at 1, is adapted to connect to and establish communication between a milk feed hose 2 and the fixed pipe line 3 of a continuous milking system in a dairy.

The valve 1 comprises a body part 4 fixed to the pipe line 3 and projecting laterally therefrom; such body part 4 including an axial bore 5 which communicates with the interior of the pipe line 3.

The axial bore 5 runs straight for a short distance from the pipe line 3 and then flares to form a wide angle taper seat 6.

The numeral 7 indicates an elongated separable body part having an axial passage 8 extending therethrough; the outer end portion of said separable body part 7 being formed as an attachment neck 9 on which the hose 2 is fitted.

At its inner end the separable body part 7 is formed with a frusto-conical coupling head 10 adapted to engage in matching relation in the wide angle taper seat 6 of the fixed body part 4.

The frusto-conical coupling head 10 is formed, in the face thereof, with an annular channel 11 in which a ring seal 12 is disposed; said ring seal 12 being shaped to project out of the annular channel 11.

When the frusto-conical coupling 10 is forcefully engaged in the wide angle taper seat 6, the ring seal 12 compresses against such seat in sealing relation to the parts; the passage 8 then being in communication with the straight inner end portion of the axial bore 5.

The following mechanism is employed for quick-detachably coupling the head 10 in the taper seat 6:

The separable body part 7 is formed, immediately outwardly of the head 10, with opposed laterally projecting, locking dogs 13 which engage in corresponding outwardly projecting, laterally inwardly opening hooks 14 formed on the fixed body part 4 beyond opposite sides of the taper seat 6.

The working faces 14a of the hooks 14 are oppositely cam-inclined, and there being substantially matching inclination of the corresponding faces of the locking dogs 13. Upon engagement of the head 10 in the taper seat 6 and subsequent part-rotation of the body part 7 to engage the dogs 13 behind the hooks 14 from an initial rotative position clear thereof, said cam-inclined faces urge the body part 7 axially inwardly, forcefully engaging the head 10 in said seat 6, with the ring seal 12 under relatively high compression.

While the parts are normally held in forceful engagement, as above, they can be quickly detached manually merely by the simple expedient of part-rotation of the body part 7, and re-engagement is accomplished with equal ease.

The separable body part 7 is formed with a substantially vertical-axis taper bore 15 extending therethrough and in which taper bore a removable taper plug valve 16 is engaged in matching relation. The taper plug valve 16 has a cross bore 17 therethrough whereby in one rotative position of said plug valve, communication is established through the passage 8, and in another position such passage is blocked. The taper plug valve 16 is formed at its upper end with a stem 18 having a radial handle 19 thereon, such handle being parallel to the axis of the body part 7 when said plug valve 16 is open.

The following arrangement is provided to normally prevent axially upward displacement of the plug valve 16 and its accidental escape from the taper bore 15.

The fixed body part 4 is formed on top with a longitudinal, upwardly opening notch 20; such notch being shallow and substantially rectangular in cross section. The notch 20 forms a seat and locator for the inner end of a hold-down finger 21, and such end of the finger is secured in said seat by a screw 22 having a head 23.

The notch 20 this locates the hold-down finger 21 against lateral motion.

Intermediate its ends the hold-down finger 21 is upwardly offset, as at 24, and the horizontal, outer end portion 25 of such finger has a headed screw 26 threaded therethrough and projecting downwardly. The headed screw 26 is run down so that its lower end normally forcefully engages in an upwardly opening recess 27 in the upper end of the stem 18 of taper plug valve 16.

With this arrangement the taper plug valve 16 is normally maintained in position in the taper bore 15, although the radial handle 19 may be manipulated to open or close said valve.

However, when the separable body part 7 is to be part-rotated to quick-detach it from the fixed body part 4, the screw 26 is backed away or upwardly from and escapes the recess 27. Thereafter, the separable body part 7 can be uncoupled from the fixed body part 4 without obstruction, and with the screw 26 clear of the stem 18 the taper plug valve 16 may be withdrawn from the taper bore 15.

As a consequence the parts of the device can be quick-detached for washing and sterilization after completion of each milking operation, and then easily reassembled by hand.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A valve comprising a body part having a bore flared at one end to form a taper seat, an initially separate body part having an axial passage therethrough, a frusto-conical coupling head on one end of the initially separate body part adapted to engage in said seat with the passage in communication with the bore, means quick-releasable upon part-rotation of said initially separate body part securing the coupling head in said seat, said separate body part having a taper bore thereacross, a taper plug valve removably engaged in said taper bore, a longitudinally upwardly opening seat forming and locator notch on top of said first named body part, a longitudinally extending hold-down finger having its inner end engaged in locating relation in said notch, means securing said inner end of the hold-down finger in said notch, the finger thence projecting in overhanging relation to the taper plug valve, and a screw threaded downwardly through the finger and normally engaging the upper end of the valve in hold-down relation.

2. A valve, as in claim 1, in which the hold-down finger is upwardly offset intermediate its ends, with a horizontal outer end portion; the screw being threaded through the latter.

3. A valve, as in claim 2, in which the taper plug valve includes an upstanding stem having a recess in its upper end; the screw engaging in said recess.

4. A valve unit comprising separate body parts provided with a bore therethrough and formed with co-engaging seats about the bore at the adjacent ends of the parts, means between the parts to releasably couple the same together, a plug valve member removably projecting across the bore of one body part, and means mounted on the other body part and releasably engageable with the other member when the parts are coupled together to prevent removal of said member and also preventing uncoupling of the body parts; the valve member being rotatable without axial movement for opening and closing of the valve; said last named means comprising an axially projecting stem on the valve member having a recess in its outer end, a finger secured on said other body parts overhanging the stem in clearance relation thereto when the body parts are coupled together, and a screw mounted in the finger in axial alinement with the stem when the body parts are so coupled and arranged to enter the recess and engage the stem in hold-down relation upon advance of the screw from a retracted position.

ROBERT E. REEVE.

References Cited in the file of this patent

UNITED STATES PATENTS

| Number | Name | Date |
|---|---|---|
| 209,380 | Connelly | Oct. 29, 1878 |
| 322,286 | Hemje | July 14, 1885 |
| 767,843 | Smith | Aug. 16, 1904 |
| 831,060 | Grunfeld | Sept. 18, 1906 |
| 1,622,216 | Anlauf | Mar. 22, 1927 |
| 1,695,207 | Sangster | Dec. 11, 1928 |
| 1,846,865 | Hapgood | Feb. 23, 1932 |
| 2,258,017 | King | Oct. 7, 1941 |

FOREIGN PATENTS

| Number | Country | Date |
|---|---|---|
| 38 | Great Britain | of 1870 |